Patented Nov. 29, 1927.

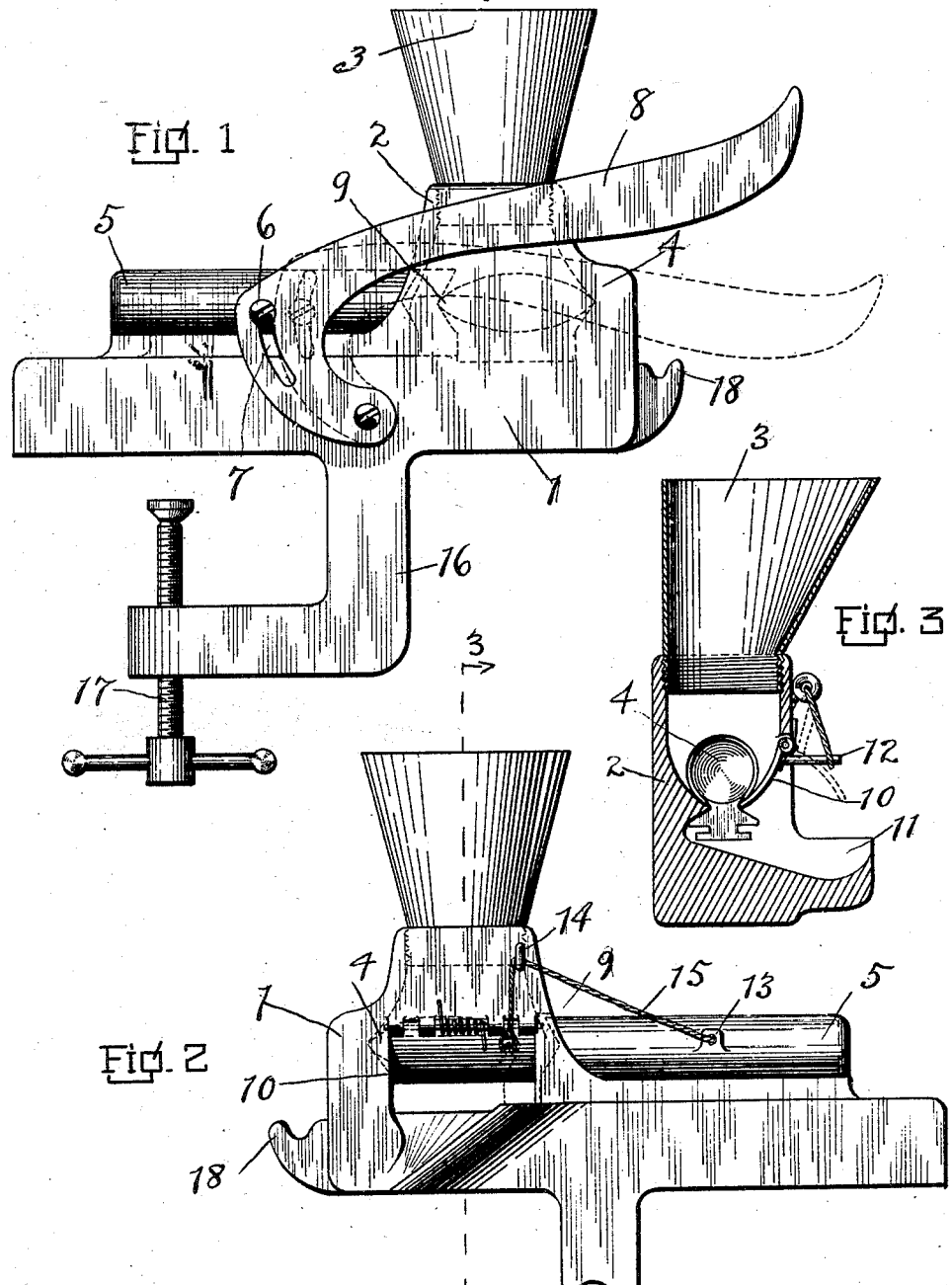

1,650,681

UNITED STATES PATENT OFFICE.

WILLIAM T. ANDERSON, OF TULSA, OKLAHOMA.

NUTCRACKER.

Application filed April 6, 1926. Serial No. 100,148.

This invention relates to nut crackers and the object of the invention is to provide a construction which will crack nuts of various sizes.

Another object of the invention is to provide in such construction a cracking device which will adjust itself automatically to the size of the nut to be cracked.

Another object of the invention is to provide the nut cracking elements with an enclosed cracking hood whereby injury to the person using the device is prevented, either from the flying broken particles of the nuts or from pinching the fingers during the cracking operation.

Another object of the invention is to provide a means cooperating with the cracking device for supporting a receptacle for the crushed nuts adjacent an opening in the closed head, thereby preventing any unnecessary litter when using the nut cracker.

I accomplish the above, and other objects of the invention which will be apparent as the description proceeds, by means of the construction shown in the accompanying drawings, in which Fig. 1 is a rear elevation of the nut cracker which is the subject of this invention, the interior construction of the cracking parts and the adjusted position of the operating means being shown in dotted lines;

Fig. 2 is a front elevation of a portion of the nut cracker, and

Fig. 3 is a section on the line 3—3 of Fig. 2.

On the drawings, in which like reference characters indicate like parts on all the figures thereof, 1 indicates the elongated casting which forms the main body of the device and constitutes the support for the cracking elements. The casting 1 is provided with a hollow cracking head 2 having an opening in the top thereof, in which opening is detachably mounted the funnel 3 through which the nuts to be cracked are dropped.

One end of the cracking head is closed and provided with a depression or groove 4 in which one end of the nut is adapted to rest. The opposite end of the cracking head is provided with an opening through which the plunger 5 is adapted to pass when the device is operated.

The plunger 5 is provided with a screw 6 or similar protuberance, which rides in a curved slot 7 formed in the operating handle 8 which is pivoted to the casting 1. The screw 6 is preferably provided with a gasket of ordinary construction in order to eliminate unnecessary friction. The handle 8 constitutes the operating means for the plunger, the slot 7 being of such form with relation to the pivot for the member 8 that the plunger will be reciprocated during the pivotal movement of the operating handle.

The plunger is provided with a groove or depression 9 on its inner face which cooperates with the groove or depression 4 on the cracking head to position the nut during the crushing operation.

The lower front of the cracking head is open and provided with a spring hinged trap door 10, the opposed interior face of the head and the hinged door being of curved formation to support the body of the nut and to hold it in position to be crushed between the head and the plunger.

The casing 1 is provided with a hollowed out portion or tray 11 into which the nuts will drop when the trap door is open.

The door and plunger are each provided with projections 12, 13 respectively, and the casing with an eyelet 14, these elements providing mountings for a cord 15 whereby the plunger and the trap door will be simultaneously operated.

While I have shown a flexible cord connecting the plunger and door, it is obvious that other mechanical equivalents may be substituted therefor within the purview of my invention. It is only necessary that there be a direct operative connection between the plunger and the door.

The nut cracker is provided with suitable means for attaching it to a table or similar support, this means consisting of an arm 16 forming a part of the casing and the screw 17; a table or similar support may thus be clamped between the casing and the screw, as is apparent.

The operation of the device is as follows:

The cracker being in position upon the support, a nut is dropped into the hopper, passing down therethrough and into the interior of the cracking head until it is stopped between the jaws of the plunger and the head. The operating handle is then moved on its pivot until the plunger is in position to be properly centered between the plunger and head. Operation of the handle to the dotted line position shown in Fig. 1 will force the plunger against the nut and crush it. The operating handle is then moved upward on its pivot thus reciprocating the plunger in the opposite direction, releasing the nut. This reciprocation of the plunger lifts the trap door through the medium of the cord and the nut passes out into the trap portion of the casing.

In order to receive the nuts as they pass from the tray, a hook 18 is provided on which may be hung a basket, a bucket or other suitable receptacle.

It is thus seen that I have provided a simple and effective nut cracker, composed of few parts but one which will operate to crush the nuts of different sizes with minimum effort. It will also be seen that the nut is entirely enclosed during the crushing operation so that there will be no flying particles which might prove annoying and dangerous, and that there will be no danger of the operator's fingers being pinched by the cracking elements. The arrangement will also prove a labor saving device since there will be no litter scattered around while the cracker is being used.

While my nut cracker is particularly efficacious for the cracking of pecans of various sizes, it is apparent that it is not limited in its function to the crushing of such nuts, but may be employed with advantage for the crushing of many types of nuts, such as hazel nuts, filberts, butternuts, almonds and small brazil nuts, in fact any nut which will go through the hopper.

Having thus described my invention, what I claim as new and desire to secure by Letters Patent is:—

1. In a device of the class described, a casing, said casing having an enclosed cracking head, said head having a discharge opening and a funnel filling opening, a closure for said discharge opening, a plunger reciprocating in said head, a positive connection between said plunger and said closure, said plunger and said head being provided with depressions for supporting the nut to be crushed, a handle provided with a curved slot pivoted to said casing, means on said plunger cooperating with said slot whereby movement of the handle in one direction will reciprocate the plunger to crush the nut and movement in the opposite direction will open the closure to discharge the crushed nut.

2. In combination, a supporting base, an enclosed cracking head carried by said base, a plunger in said head for cracking nuts, said head being provided with a discharge opening in the lower portion thereof, a normally closed door for said opening, means directly connected to said plunger and said door whereby movement of the plunger to inoperative position opens said door, said base having a portion extending in front of and below said discharge opening constituting a receptacle support.

In testimony whereof I affix my signature.

WILLIAM T. ANDERSON.